UNITED STATES PATENT OFFICE.

CIRILO MINGO, OF NEW ORLEANS, LOUISIANA.

METHOD OF AGING COFFEE.

SPECIFICATION forming part of Letters Patent No. 505,883, dated October 3, 1893.

Application filed August 17, 1893. Serial No. 483,313. (No specimens.)

*To all whom it may concern:*

Be it known that I, CIRILO MINGO, a citizen of Mexico, residing at New Orleans, in the parish of Orleans and State of Louisiana, have invented certain new and useful Improvements in Aging Coffee; and I do hereby declare the following to be a full, clear, and exact description of the invention, such as will enable others skilled in the art to which it appertains to make and use the same.

My invention relates to a method of maturing and aging green coffee berries, for the purpose of imparting to said berries, by a summary operation, the qualities and characteristics possessed by coffee berries which have been stored and confined under favorable conditions for a comparatively long period of time.

In carrying out my invention I proceed in practice as follows: I take textile material, preferably fabric of linen, hemp or jute, and subject the same to a preliminary dampening. I have found it convenient to employ, as the textile material to be dampened, the usual coffee bags or sacks of burlap, having a superficial area of about six square feet. In dampening these bags, I proceed as follows: I first spread out one of the bags on the floor of a room and sprinkle the bag, by means of a watering pot or spray nozzle, with a limited quantity of water. I then spread out upon the said bag, another bag, which I in like manner sprinkle with water, and thus continue, spreading out a third bag upon the second bag, and a fourth bag upon the third bag, and so on until a pile of bags of about four feet in height is made up, each bag receiving the same sprinkling of water. In like manner, I make up a second, third, fourth, &c., pile of sprinkled bags. The making up of these piles of sprinkled bags may conveniently be done by two workmen, one of whom spreads the bags on top of each other while the other sprinkles them. When the first pile of bags is completed, and the second pile is about to be begun, a third workman inverts the first pile of bags one by one, beginning at the top and forming a new pile, so that the top bag will form the lowermost one of the series and the bottom bag will occupy the position formerly occupied by the top bag.

The object of this inversion of the bags is to distribute the moisture or dampness more uniformly throughout them so that each shall possess substantially the same degree of dampness. In like manner the third workman inverts the second, third, fourth, &c., piles of bags as soon as they are formed, until all the bags have been duly sprinkled, piled up, and the piles inverted.

Each pile preferably contains about four hundred bags, to sprinkle and pile which requires about twenty minutes. To construct three such piles requires about one hour and at the end of the hour, the first pile, which in the meantime has been inverted, is ready for use. I spread, upon the floor, one of the damp bags thus ready for use, and upon said damp bag I spread a dry bag. I then spread, upon the dry bag, a layer of green coffee berries, covering its surface and employing about one pound of coffee berries to each square foot of bag surface. On top of the coffee berries, I place another dry bag, and upon this second dry bag, I place one of the damp bags, and proceed in like manner until a pile of about four feet in height is made up. Thus, each layer of green coffee berries is located between two dry bags, these two damp bags having a damp bag below and a damp one above. When the pile is finished, I place, on its top, heavy planking or the like of the same size as the bags, for the purpose of compressing the pile by its weight.

The object of interposing the dry bags between the damp bags and the coffee is to insure as far as possible against excessive dampening of the coffee berries. The dry bags, under the influence of the compression, themselves absorb moisture from the damp bags, and become themselves proportionately damp, thereby absorbing excess of moisture and transferring to the coffee berries only about one-fourth of the moisture of the original damp bags.

I leave the layers of coffee berries, thus piled up between the layers of bags, for a period of from six to sixteen hours, according to the character of the berries treated and until the berries have absorbed from eight to ten per cent. of moisture, in the damp atmosphere of the confined space within which they are contained. I then take out the coffee berries, and dry them, either by spreading the berries out in very thin layers and subjecting them to the rays of the sun, or by subjecting them to a blast of cool dry air, the drying operation being continued until the coffee berries have given up all of the moisture absorbed from the damp bags, and preferably two or three per cent. of moisture in addition. The process is thus completed, and the coffee berries are found to have developed the same flavor obtained by the process of nature, and to have increased in size, being in an expanded and brittle condition peculiarly adapted for roasting. It may then be placed in dry bags for storage or transportation.

I am aware that it has been proposed to subject coffee to the action of steam with the intention of aging it, and I am also aware that it has been observed that when a vessel containing a cargo of green coffee berries has encountered severe storms requiring the hatches to be battened down and prolonging the voyage beyond its usual duration, a portion of the berries become more or less matured or aged and also that it has been observed that when a cargo of coffee berries has been dampened by water it becomes heated and more or less matured. But I do not claim any of these processes, but only the way particularly pointed out in the claims hereinafter made for obtaining the desired result.

What I claim is—

1. The process of maturing or aging green coffee berries, which consists in spreading out the berries in a thin layer between layers of damp textile material, and permitting them to remain thus confined until the desired aging effect has been produced; substantially as described.

2. The process of maturing or aging green coffee berries, which consists in sprinkling a number of bags, piling said bags upon each other until they have become uniformly moistened, spreading out one of said bags, spreading upon it a dry bag, spreading a layer of green coffee berries upon the dry bag, spreading a dry bag upon the layer of green coffee berries, spreading a damp bag upon the upper dry bag, compressing the pile of bags thus formed whereby the dry bags absorb moisture from the damp bags and become damp, and maintaining the coffee berries in the confined space until the desired aging effect has been produced; substantially as described.

In testimony whereof I affix my signature in presence of two witnesses.

CIRILO MINGO.

Witnesses:
C. W. EUSTIS,
IRVIN FUERST.